United States Patent
Yoshizawa et al.

[11] Patent Number: 6,132,900
[45] Date of Patent: Oct. 17, 2000

[54] METHOD OF PRODUCTION OF NON-AQUEOUS ELECTROLYTE BATTERY AND SEAL PLATE THEREOF

[75] Inventors: Hiroshi Yoshizawa, Hirakata; Kazunori Haraguchi, Osaka; Takuya Nakashima, Neyagawa; Takashi Takeuchi, Kadoma; Yoshitaka Matsumasa, Takatsuki; Kikuo Senoo, Kobe; Takabumi Fujii, Suita; Mamoru Iida, Kadoma; Kenji Mizuno, Hirakata, all of Japan

[73] Assignee: Matsushita Electric Industrial Co., Ltd., Osaka, Japan

[21] Appl. No.: 09/139,482

[22] Filed: Aug. 25, 1998

Related U.S. Application Data

[63] Continuation-in-part of application No. PCT/JP97/04679, Dec. 18, 1997.

[30] Foreign Application Priority Data

| Dec. 25, 1996 | [JP] | Japan | 8-344841 |
| Feb. 18, 1997 | [JP] | Japan | 9-033406 |
| Jun. 30, 1997 | [JP] | Japan | 9-173437 |

[51] Int. Cl.$^7$ .................................................. H01M 02/08
[52] U.S. Cl. ........................... 429/185; 429/181; 429/178; 429/57; 29/623.1
[58] Field of Search .................................... 429/185, 174, 429/178, 181, 57, 65; 29/623.1

[56] References Cited

U.S. PATENT DOCUMENTS

| 4,658,795 | 4/1987 | Yamaura et al. | 29/623.1 |
| 5,344,724 | 9/1994 | Ozaki et al. | 429/94 |
| 5,665,483 | 9/1997 | Saito et al. | 429/53 |
| 5,672,443 | 9/1997 | Salisbury et al. | 429/185 |
| 6,004,692 | 12/1999 | Muffoletto et al. | 429/163 |

FOREIGN PATENT DOCUMENTS

| 2-112151 | 4/1990 | Japan . |
| 5-82113 | 4/1993 | Japan . |
| 7-7665 | 1/1995 | Japan . |
| 7-211305 | 8/1995 | Japan . |
| 8-31429 | 2/1996 | Japan . |
| 8-45488 | 2/1996 | Japan . |
| 8-77999 | 3/1996 | Japan . |
| 8-171898 | 7/1996 | Japan . |

OTHER PUBLICATIONS

Japanese search report for Int'l Appln. No. PCT/JP97/04679 dated Mar. 24, 1998.

*Primary Examiner*—Maria Nuzzolillo
*Assistant Examiner*—Raymond Alejandro
*Attorney, Agent, or Firm*—Ratner & Prestia

[57] ABSTRACT

The present invention relates to a construction of an explosion-proof safety vent for small-size non-aqueous electrolyte batteries such as prismatic lithium-ion secondary batteries or with an oval cross section hence with a small area of seal plate, and to a method of producing a seal plate. It aims at securing safety of a battery by allowing an explosion-proof vent to operate without fail with a simple construction at no sacrifice of the capacity. In order to fulfill this aim, it provides an explosion-proof safety vent wherein upper peripheral edge of an opening of a bottomed cell container made of metal and the periphery of a seal plate made of metal are hermetically sealed by laser welding, a rivet serving as a terminal is inserted in a through hole provided on the central portion of the seal plate and hermetically fixed by crimping via a gasket, an exhaust hole is provided between the terminal and the periphery of the seal plate, and the exhaust hole is closed by a metal foil. With such a simple structure, it allows the vent to operate without fail to prevent accident and also proposes a method of continuously producing seal plates in the form of a hoop.

31 Claims, 4 Drawing Sheets

METHOD OF PRODUCTION OF NON-AQUEOUS ELECTROLYTE BATTERY AND SEAL PLATE THEREOF

This application is a Continuation-In-Part application of International Application No. PCT/JP97/04679 filed Dec. 18, 1997, pending.

TECHNICAL FIELD OF THE INVENTION

The present invention relates to an explosion-proof mechanism of a battery employing a non-aqueous electrolyte such as organic electrolyte and method of production of a seal plate provided with an explosion-proof safety vent therefor.

BACKGROUND OF THE TECHNOLOGY

With the advance of electronics technology in recent years, miniaturization, lighter weight, and lower power dissipation of electronic equipment have become possible along with sophistication of functions. As a result, a variety of portable consumer electronics products have been developed and commercialized and the market size has been rapidly expanding as represented by camcorders, notebook-type personal computers, portable telephones, etc.

Further miniaturization and lighter weight as well as longer operating time of these equipment are in constant demand. In association with such demand, as built-in power source for these equipment, lithium secondary batteries as represented by long-life and high-energy density lithium-ion secondary battery have been actively developed and are in wide use. Under this trend, thin prismatic batteries are drawing attention as they are especially suitable for thinning of equipment and provide higher space efficiency.

The lithium-ion secondary battery is a battery system which employs a lithiated transition metal complex oxide as the positive active material, a graphite or carbon as the negative active material, and a non-aqueous electrolyte such as an organic electrolyte which is a solution of a lithium salt being an electrolyte in an organic solvent or a solid electrolyte being a conductor of lithium ions. When this battery is charged, lithium ions are extracted from the lithiated complex oxide of the positive electrode and dissolve into the electrolyte and at the same time lithium ions of the same electrochemical equivalent are inserted from the electrolyte into the carbon of the negative electrode. When discharged, conversely from the case of charging, lithium ions are inserted into the positive electrode to become a lithiated complex oxide and lithium ions are extracted from the negative electrode, and this process is repeated.

As the potential of the carbon negative electrode is close to the electrode potential of metallic lithium, a lithiated complex oxide of at least one transition metal element selected from the group consisting of cobalt, nickel, and manganese which gives a high electrode potential is generally used as the positive active material.

Lithium-ion secondary batteries have an advantage of having an outstandly high energy density per unit weight among currently commercialized battery systems, to say nothing of the energy density per unit volume. However, as these batteries use in most cases organic electrolyte, in the event of external short-circuit, overcharge, or overdischarge accompanying reverse charge, the battery temperature rises with the flow of current and the solvent in the organic electrolyte evaporates or decomposes, thereby causing a rapid and abnormal increase in the internal cell pressure leading to leakage of electrolyte.

Consequently, in order to prevent rapid and abnormal increase in the internal cell pressure, overcharge and overdischarge protection circuit is usually incorporated in a battery pack consisting of plural cells and at the same time an explosion-proof mechanism of which a safety vent is triggered in the event of an increase in the internal battery pressure to release the high-pressure gas inside the battery to the air, and a PTC element to prevent an excessive current from continuously flowing is provided in each cell. Under this circumstance, a mechanism has been proposed as disclosed, for example, in Japanese Laid-Open Patent No. Hei 2-112,151 in which a lead ribbon of an electrode plate is pre-provided to an explosion-proof vent which will be deformed by an increase of the internal pressure, and when the internal pressure reaches a predetermined value, the explosion-proof vent is deformed thus either breaking the lead ribbon or detaching it from the explosion-proof vent thereby cutting off the current. As this mechanism cuts off the current by making use of the increase of the internal cell pressure due to external short-circuit, overcharge, or overdischarge accompanying reverse charge, it is superior in principle as a means to prevent accident of explosion. It is especially effective in relatively large cylindrical or prismatic batteries. However, in the case of small-size batteries such as thin prismatic or cylindrical-type batteries with which the area of the seal plate is small this mechanism had a weak point of not being applicable because of both reliability and productivity as there is dispersion in the operating pressure.

The present invention provides a non-aqueous electrolyte battery provided an explosion-proof safety vent with a superior productivity and a high-reliability by adopting in small-size batteries having a small area of seal plate, especially lithium-ion secondary batteries which are thin and square or are oval in cross section, a seal plate having a relatively simple construction yet with a sure venting action at no sacrifice of the discharge capacity.

DISCLOSURE OF THE INVENTION

The present invention provides a non-aqueous electrolyte battery having an explosion-proof safety vent, in which a cell container and a seal plate are laser welded into a single piece and sealed with the seal plate made of the same metal as the cell container fitted in the upper peripheral edge of an opening of a bottomed cell container made of metal and housing battery elements comprising an electrode group consisting of positive and negative electrodes with a separator interposed and a non-aqueous electrolyte, a metal rivet serving as a terminal is inserted and fixed in a through hole provided in the center of the seal plate via a gasket made of electrolyte resistant and electrically insulating synthetic resin, at least one exhaust hole is provided between the terminal and the periphery of the seal plate, and the exhaust hole is closed by pressing with pressure a metal foil on at least the periphery of the exhaust hole on the inner surface of the cover plate constituting the base material of the seal plate.

Further, the present invention allows to completely prevent explosion accident of a small-size non-aqueous electrolyte battery by improving operating reliability of the explosion-proof safety vent by fixing an aluminum foil outwardly swelling from the cell when aluminum is employed as the metal foil to close the exhaust hole constituting the explosion-proof safety vent, or by pre-forming a thin pattern on that portion of the metal foil which is closing the exhaust hole when nickel, stainless steel, or nickel-plated steel is used as the metal foil.

DESCRIPTION OF THE PREFERRED EMBODIMENTS

Referring now to drawings and tables, exemplary embodiments of the present invention will be described in the following.

First Exemplary Embodiment

Figure 1:
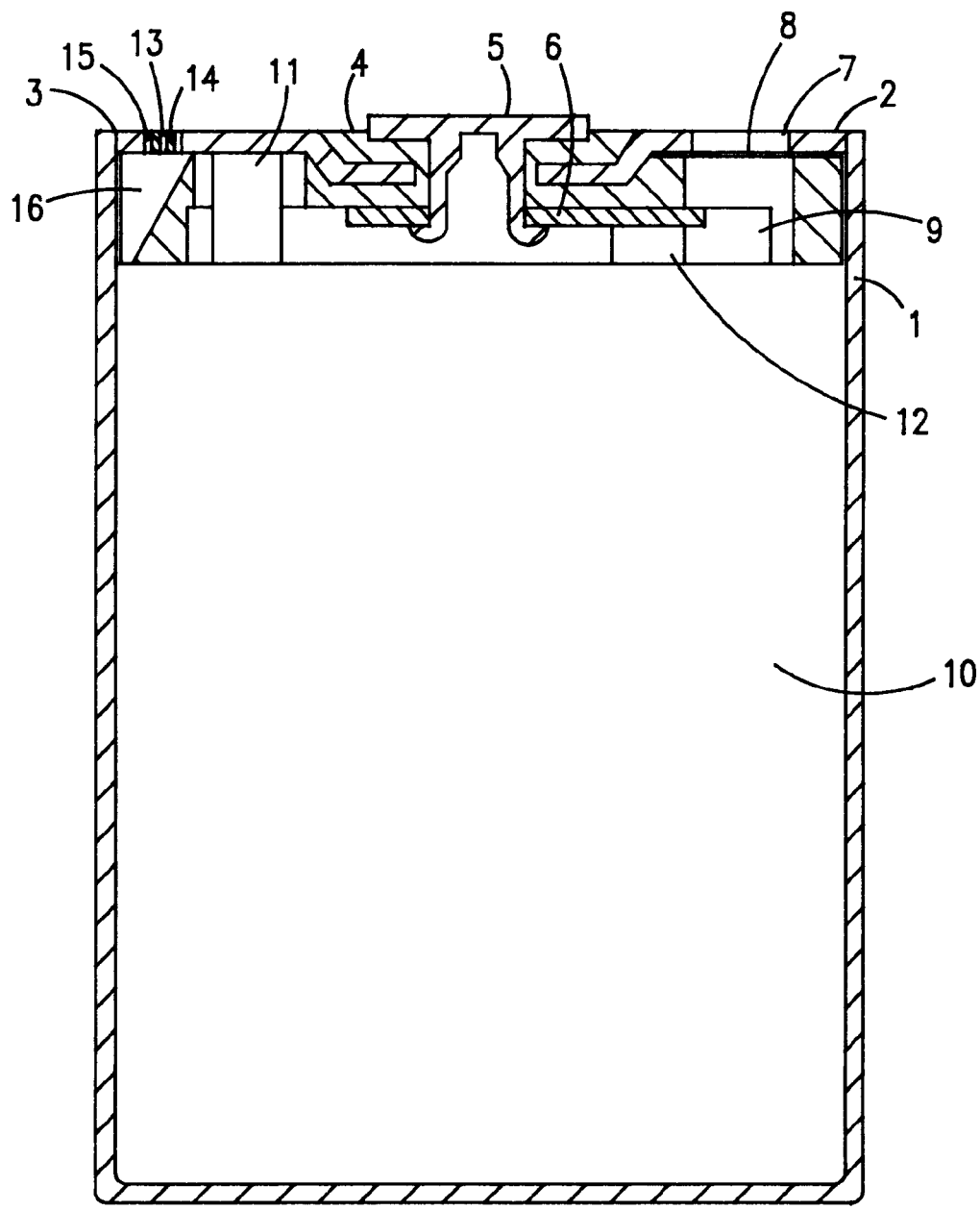
FIG. 1 is a vertical cross sectional view of a prismatic lithium-ion secondary battery in an exemplary embodiment of the present invention.

FIG. 1 is a vertical cross sectional view of a thin and prismatic lithium-ion secondary battery in the first exemplary embodiment of the present invention. In FIG. 1, a seal plate 2 made of aluminum is fitted in the upper peripheral edge of an opening of a bottomed square cell container 1 made of aluminum, and the fitting section 3 is laser welded and sealed into an integral unit in a liquid-tight and air-tight manner. An electrolyte resistant and electrically insulating gasket 4 made of synthetic resin which is coated with a sealant composing of a mixture of blown asphalt and mineral oil is integrally provided in a through hole of the seal plate 2 made after the central portion of the seal plate has been made inwardly concave. A nickel or nickel-plated steel rivet 5 serving as the negative terminal is inserted into the gasket 4, and the tip of the rivet 5 is fastened by crimping with a washer 6 made of nickel or nickel-plated steel fitted in the lower portion of the rivet 5, thus providing liquid-tight and air-tight seal. Here, the gasket 4 was molded in one piece by injection molding together with the seal plate 2. Between the negative electrode terminal 5 and the outer edge of the longer side of the seal plate 2 is provided an oval exhaust hole 7, and an aluminum foil 8 is pressed under pressure to the inner surface of the seal plate 2 into a single piece. As a result the exhaust hole 7 is closed by the aluminum foil 8 thus configuring an explosion-proof safety vent. An electrode group 10 having an oval cross section is constructed by winding one sheet each of positive and negative electrodes with a separator of microporous polyethylene film interposed and wrapping the outermost surface with the separator. A positive electrode lead ribbon 11 made of aluminum of the electrode group 10 and the inner surface of the seal plate 2 are connected and fixed by laser spot-welding while a negative electrode lead ribbon 12 made of nickel and the washer 6 are connected and fixed by resistance welding. A pouring hole 13 is provided on the seal plate 2. After pouring a predetermined quantity of an organic electrolyte, the pouring hole 13 is fitted with a lid member 14 made of aluminum, and the fitting section 15 between the seal plate 2 and the lid member 14 is sealed by laser welding in a liquid-tight and air-tight manner thus completing a prismatic battery.

The positive electrode is made by coating on both sides of an aluminum foil used as the core material a paste prepared by blending 100 parts by weight of an active material, namely, a lithiated cobalt complex oxide ($LiCoO_2$), 3 parts by weight of an electric conductor, namely, acetylene black, and a binder, namely, a dispersion solution of poly-4-ethylene fluoride (having 10 parts by weight of solid), followed by drying, rolling under pressure, and cutting to a predetermined size. The positive electrode lead ribbon 11 made of aluminum is welded to the aluminum foil used as the core material of the positive electrode.

The negative electrode is made by coating on both sides of a copper foil used as the core material paste prepared by blending 100 parts by weight of graphitized carbon powder to be used as the negative electrode material and a binder, namely, a dispersion solution of styrene-butadiene rubber (5 parts by weight of solid), followed by drying, rolling under pressure, and cutting to a predetermined size. The negative electrode lead ribbon 12 made of nickel is welded to the copper foil used as the core material of the negative electrode.

The organic electrolyte is prepared, for example, by dissolving 1.0 mol of lithium hexaflurophosphate ($LiPF_6$) into a mixed solvent of ethylene carbonate (EC) and diethylcarbonate (DEC) at 1:3 mol ratio to a concentration obtained by diluting it to 1 liter. In pouring the organic electrolyte, a pouring apparatus having a 3-prong cock is used. Internal pressure of a cell is first reduced by means of a vacuum pump and then electrolyte is introduced by turning over the cock. During this process, the organic electrolyte is first introduced via an electrolyte-introducing groove 16 shown in FIG. 1 to a space 17 formed between the inner wall of the prismatic cell container 1 and the outer surface of the electrode group 10 shown in the plan view of the prismatic battery in FIG. 2. It has thus a merit of preventing overflow of the organic electrolyte which might otherwise wet the pouring hole 13 and eliminating possible difficulty in subsequent process of welding. The organic electrolyte collected in the space 17 is successively absorbed and fixed inside the electrode group 10. Although the electrode group 10 described here has been wound to a configuration having an oval cross section, the method of the present invention is conducive to prismatic cells in general wherein the electrode group is composed of plural sheets of positive and negative electrodes with a separator interposed.

In FIG. 1, the central portion of the seal plate 2 is shown to have been concaved inwardly toward the cell by drawing. A study was made on 50 pieces each of prototype prismatic lithium-ion secondary batteries processed and not processed with such drawing as to the rate of visually inspected deformation of the gasket after laser welding and the rate of leakage of electrolyte after letting them stand for a period of 3 days at 85° C. in a charged state to see the thermal effect associated with laser welding of the cell container and the seal plate. By the way, polypropylene resin was used in the gasket.

TABLE 1

| Type | Rate of Gasket Deformation (%) | Rate of Leakage (%) |
| --- | --- | --- |
| Flat Seal Plate | 15 | 4 |
| Concaved Seal Plate | 0 | 0 |

It is obvious from Table 1 that by drawing the central portion of the seal plate so that it is inwardly concaved toward the inside of the cell, the influence of heat associated with laser welding has been reduced. It is also expected through this concave drawing that the pressure resistance of the seal plate can be enhanced in the event the internal cell pressure rises.

Although FIG. 1 shows a state where the aluminum foil 8 is pressed with pressure only at the portion closing the exhaust hole 7, it is equally effective to press the aluminum foil 8 with pressure over the entire inner surface of the seal plate 2 into a clad sheet.

Second Exemplary Embodiment

Similar to the gasket used in the prototype cell in the first exemplary embodiment, polypropylene resin has heretofore been generally used as the gasket material for lithium primary batteries in general that employ metallic lithium as the negative active material, manganese dioxide or fluorinated graphite as the positive active material, and organic electrolyte as the non-aqueous electrolyte, because of its superior performance at injection molding and low cost. Compression rate of the polypropylene gasket at the time of sealing by crimping has heretofore been adjusted to 50 to 70%.

Figure 2:
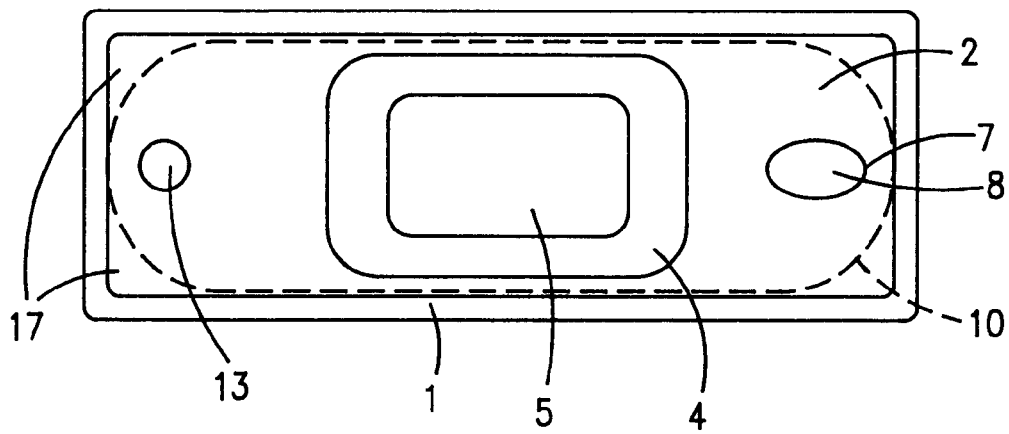
FIG. 2 is an external plan view of a prismatic lithium-ion secondary battery in accordance with the present invention.

In this invention, as the cell container and the seal plate are hermetically sealed by laser welding, care has to be taken on the influence of gasket being heated. In this respect, a gasket material which is resistant to electrolyte and thermally relatively stable is desirable in the present invention. Also, in the case of a small-size battery in which the area of the seal plate is small such as in the thin prismatic battery in accordance with the present invention, as the diameter of the rivet constituting the negative terminal becomes very small, it is desirable to make the compression rate of the gasket material at the time of crimping the rivet to as low as 30%. Now, referring to existing data, 3 types of synthetic resins, namely, polypropylene (PP), polyethylene terephthalate (PET), and polypheniline sulfide (PPS), have been selected as electrolyte resistant materials from among about 20 types of synthetic resins. Appropriateness of these 3 types of synthetic resins as gasket material was evaluated by experimentally fabricating the same prismatic lithium-ion secondary batteries as in the first exemplary embodiment as shown in FIG. 1 and FIG. 2, and observing leakage after thermal shock test on each set of 50 cells in a charged state.

The thermal shock test consisted of 1000 cycles of leaving for 1 hour at −50° C. followed by leaving for 1 hour at 100° C. Table 2 shows the result obtained.

TABLE 2

| Type of Synthetic Resin | Compression Rate of Resin (%) | Leakage Rate (%) |
| --- | --- | --- |
| Polypropylene (PP) | 70 | 70 |
| Polyethylene terephthalate(PET) | 60 | 50 |
| Polyphenylene sulfide (PPS) | 30 | 0 |

It can be seen from Table 2 that, in a non-aqueous electrolyte battery in accordance with the present invention in which the cell container and the seal plate are hermetically sealed by laser welding, use of PPS resin which has a superior heat resistance as the gasket material to hermetically seal by crimping the rivet in the central portion of the seal plate and serving as the terminal contributed to improvement of anti-leakage performance. Here, the compression rate of gaskets made of each type of resin has been adjusted to provide the same degree of hermeticity.

Third Exemplary Embodiment

A study has been made of the configuration of an exhaust hole as it relates to the operating pressure of an explosion-proof safety vent in which a metal foil is pressed together under pressure and integrated with the exhaust hole provided on the seal plate in accordance with the present invention. In making an exhaust hole, punching with a die is the method generally adopted in industry. Dispersion of the operating pressure of the explosion-proof safety vent was studied of 100 pieces of seal plates for each of 4 configurations of the exhaust hole, namely, circular, oval, square, and rectangular, excluding complicated shapes such as triangular or star-like shape for the reason of maintenance of a die and productivity. Table 3 shows the results obtained.

Cover plate material made of aluminum (0.6 mm thick), being the base material of the seal plate, and an aluminum foil (0.03 mm thick) were clad by rolling under pressure. The operating pressure of the safety vent is heavily dependent on the thickness of the aluminum foil and the configuration of the exhaust hole. It can be seen from Table 3 that, for an aluminum foil with the same thickness, the operating pressure of the safety vent varied widely with the configuration of the exhaust hole. In the case of oval configuration, the aluminum foil was selectively fractured in the section of small arc. It is therefore preferable to make the configuration of the exhaust hole oval if permissible from both the shape and dimension of the seal plate.

TABLE 3

| Configuration of Exhaust Hole | Average Operating Pressure of Safety Vent (kg/cm$^2$) | Dispersion ($\sigma$) |
| --- | --- | --- |
| Circular | 10.5 | 2.20 |
| Oval | 10.3 | 0.50 |
| Square | 10.9 | 1.88 |
| Rectangular | 10.1 | 1.52 |

Fourth Exemplary Embodiment

When prismatic cells become thinner and the dimension of the seal plate smaller, it will become difficult to always make the configuration of the exhaust hole of the explosion-proof safety vent oval as confirmed in the third exemplary embodiment.

Therefore, when a high-precision easy-to-process circular configuration is adopted for the exhaust hole, it is desirable that the safety vent accurately operates with little dispersion.

As described earlier, an explosion-proof safety vent is formed by closing the exhaust hole with an aluminum foil through a cladding process in which the cover plate material made of aluminum which is the base material of the seal plate and an aluminum foil are pressed between rollers into a single piece. By changing the pressure of the rollers, the aluminum foil closing the exhaust hole changes its shape from a flat state to a state of outward swelling. However, when an excessive pressure is applied by the rollers, the aluminum foil will be torn off and fractured without closing the exhaust hole thus failing in configuring an explosion-proof safety vent.

Figure 3:
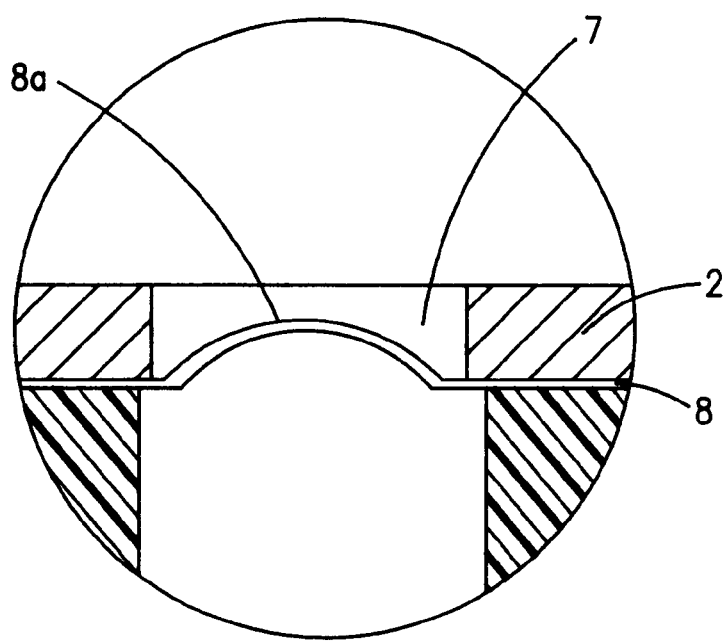
FIG. 3 is an example of an enlarged cross sectional view of an explosion-proof safety vent portion of a seal plate comprising an aluminum cover plate and a metal foil in accordance with the present invention.

Therefore, dispersion of the operating pressure was studied on 100 samples each of two types of explosion-proof safety vents, namely, one in which the aluminum foil is flat as shown in FIG. 1 and the other in which metal foil such as aluminum is swelling outwardly 8a, FIG. 3, of the cell. Table 4 shows the result obtained.

TABLE 4

| Configuration of Aluminum Foil Cross Section | Average Operating Pressure of Safety Vent (kg/cm$^2$) | Dispersion ($\sigma$) |
| --- | --- | --- |
| Flat | 10.5 | 2.20 |
| Convexly swelling | 10.3 | 0.40 |

As is clear from Table 4, the one in which the aluminum foil closing the exhaust hole is convexly swelling outward had smaller dispersion of the operating pressure of the explosion-proof safety vent. In this case, the performance compares favorably with the oval configuration of the exhaust hole in the third exemplary embodiment or even showed better result. While the reason is not clear, it may be because gas pressure inside the cell is exerted uniformly over the entire inside surface of the convexly swelling aluminum foil and the fracture at the linear pressure-welded section between the aluminum foil and the inner periphery of the exhaust hole becomes uniform.

Fifth Exemplary Embodiment

High reliability under severe environmental conditions is required of various non-aqueous electrolyte batteries such as lithium-ion secondary battery as power sources for portable equipment. When these batteries are left for an extended period under a high-temperature and high-humidity environment, leakage of the organic electrolyte from around the explosion-proof safety vent was observed in some of the batteries.

Therefore, effect of coating the outer surface of the aluminum foil that closes the exhaust hole of a seal plate with an organic anti-corrosion agent was studied by coating a small amount of non-moisture-absorbing, chemically stable, and plastic solution prepared by dissolving coal tar, Vaseline, and asphalt into an organic solvent followed by evaporating the solvent.

First, seal plates were prepared in which the outer surface of the aluminum foil closing the exhaust hole of an explosion-proof safety vent had been coated with organic anti-corrosion film composing of coal tar pitch and Vaseline. Fifty cells each of prismatic lithium-ion secondary batteries were fabricated under the same conditions as in the first exemplary embodiment, and were left for 3 months under a high-temperature and high-humidity condition of 60° C. and 90% RH in a charged state. Table 5 shows the result of visual inspection of the leakage rate of batteries after being left.

TABLE 5

| Organic Anti-corrosion Agent | Leakage Rate (%) |
| --- | --- |
| None | 10 |
| Coal tar pitch | 2 |
| Vaseline | 2 |

As is clear from Table 5, it is likely that less leakage occurred even when a non-aqueous electrolyte battery was left for an extended period under a high-temperature and high-humidity environment because the aluminum foil had become less susceptible to corrosion by coating an organic anti-corrosion agent on the outer surface of the aluminum foil of the explosion-proof safety vent.

In addition to coal tar pitch and Vaseline, other non-moisture-absorbing, chemically stable and highly plastic material such as a mixture of blown asphalt and mineral oil for use as a sealant to be coated on the surface of the gasket is also effective as an organic anti-corrosion agent.

The first through fifth exemplary embodiments represent examples in which the cell container and the seal plate comprising a cover plate and a metal foil are entirely made of aluminum and the polarity is that of the positive electrode. The present invention has also been described in detail by way of an example in which the terminal, which is a rivet hermetically fixed in the central portion of the seal plate via a gasket, and the washer are usually made of nickel or nickel-plated steel, and their polarity is that of the negative electrode. However, depending on the battery design, one has to consider the necessity of reversing the polarity in a cell construction similar to those described in these exemplary embodiments, namely, a construction in which a seal plate comprising a cell container, a cover plate, and a metal foil is entirely made of nickel, stainless steel, or nickel-plated steel, and the polarity is that of the negative electrode, while the terminal, which is a rivet hermetically fixed in the central portion of the seal plate via a gasket, and the washer are made of aluminum and are of positive electrode polarity. The method of the present invention is conducive to batteries having polarity reverse to those in the first to fifth exemplary embodiments of the present invention and will produce similar effect.

Sixth Exemplary Embodiment

As described above, in an explosion-proof safety vent in which the cell container and the cover plate constituting base material of the seal plate are made of nickel, stainless steel, or nickel-plated steel, and a metal foil made of nickel, stainless steel, or nickel-plated steel closes an exhaust hole provided on at least one side of the positive electrode terminal being an aluminum rivet, a problem occurs in which the metal foil will not easily fracture at a predetermined gas pressure unless it is made thinner than the case of aluminum foil described in the first to fifth exemplary embodiments. However, it is industrially difficult to roll foils of nickel, stainless steel, or nickel-plated steel to a thickness smaller than that of aluminum foil. Therefore, a thin pattern in the shape of a horse shoe, for example, was provided in advance by stamping or other means on the metal foil to close the exhaust hole of the seal plate and the effect was verified. Making use of the burrs produced on the lower surface of the cover plate of an exhaust hole by punching from above a cover plate made of nickel-plated steel having a thickness of 0.6 mm, a nickel foil is projection welded, forming an integrated hermetic seal. A horse-shoe shaped thin pattern is provided by stamping close to the inner periphery of the exhaust hole of the nickel foil. The effect of such stamping was evaluated in terms of dispersion of the operating pressure of the vent. Table 6 shows the result obtained.

TABLE 6

| Presence of Stamping | Average Operating Pressure of Safety Vent (kg/cm$^2$) | Dispersion ($\sigma$) |
| --- | --- | --- |
| Yes | 12.5 | 0.57 |
| No | 30 | 5.1 |

As is clear from Table 6, it is possible to reduce the operating pressure of the explosion-proof safety vent as well as the dispersion by providing a thin pattern on the metal foil inside the exhaust hole by stamping or other means.

This kind of means is also effective when a seal plate comprising a cell container, a cover plate, and a metal foil is entirely made of aluminum especially when the diameter of the exhaust hole is small.

Seventh Exemplary Embodiment

In constructing a prismatic battery, an electrode group is fixed by welding positive electrode and negative electrode lead ribbons to a seal plate which is provided in its central portion via a gasket with a terminal comprising a rivet and a washer, an explosion-proof safety vent, and a pouring hole, and then the electrode group is inserted in a symmetrical bottomed cell container, followed by fitting the seal plate on the upper peripheral edge of the opening of the cell container. During this process, since the seal plate to which the electrode group is connected and fixed is not necessarily symmetrical, semi-finished cells with wrong orientation may be transferred to the subsequent processes. This kind of circumstance will cause problems in process control and productivity. Therefore, in forming a seal plate, by using a belt-like hoop of cover plate, which is the base material of the seal plate, onto which components such as explosion-proof safety vent, pouring hole, terminal, etc., are successively provided, and by continuously inspecting pinholes on the metal foil and the lower limit of the operating pressure of the safety vent on all samples, and finally cutting for supply to subsequent assembling process of batteries, it will be possible to prevent semi-finished batteries with reversed orientation from being transferred on the production line, thus allowing to produce high-reliability seal plates with a superior productivity.

Figure 4:
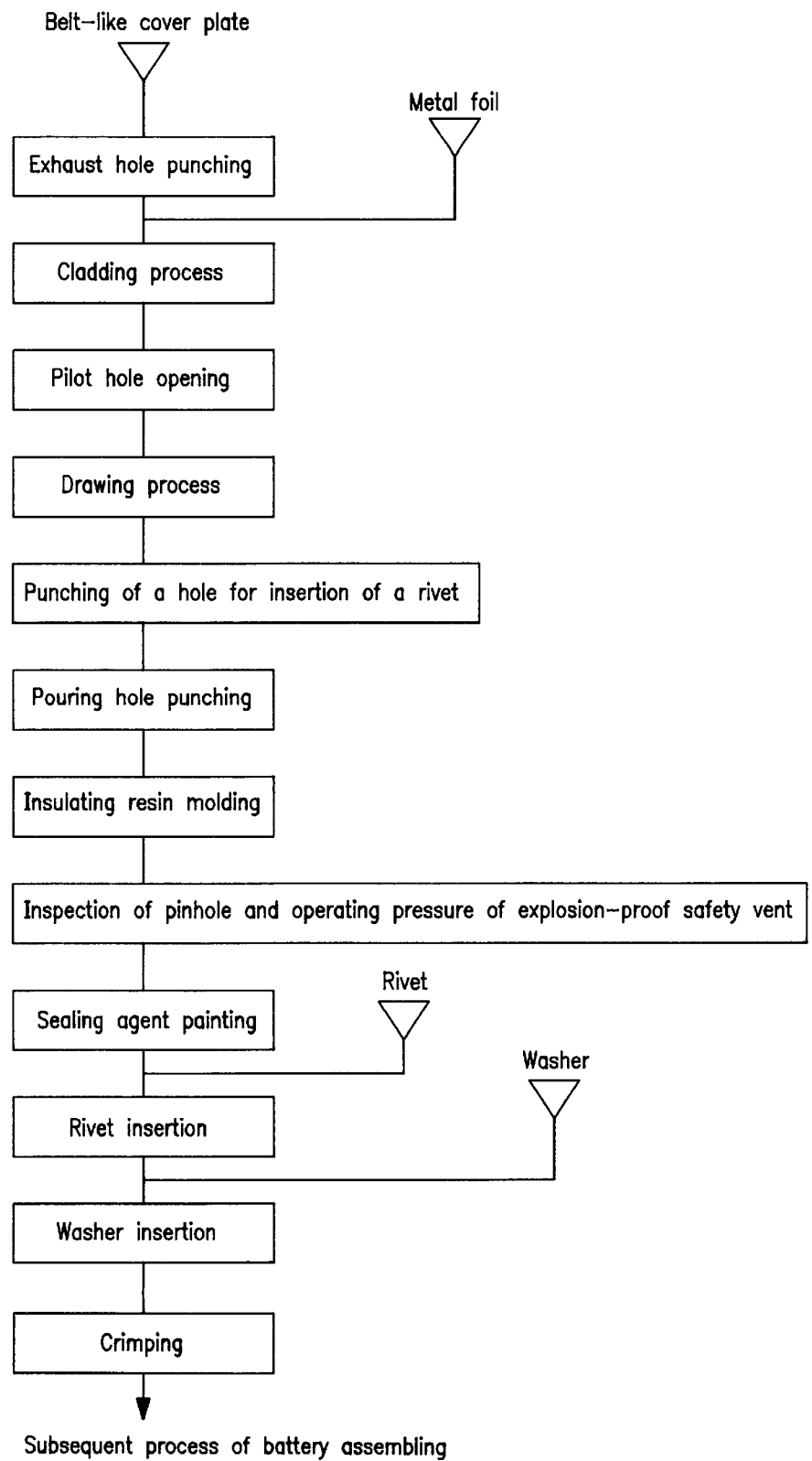
FIG. 4 is an example of a flow chart for continuous production of seal plates in accordance with the present invention.

FIG. 4 is an example of a flow chart for continuous production of seal plates of the present invention. Referring now to the flow chart of FIG. 4, the process of continuous production of seal plates will be described in the following.

Figure 5:
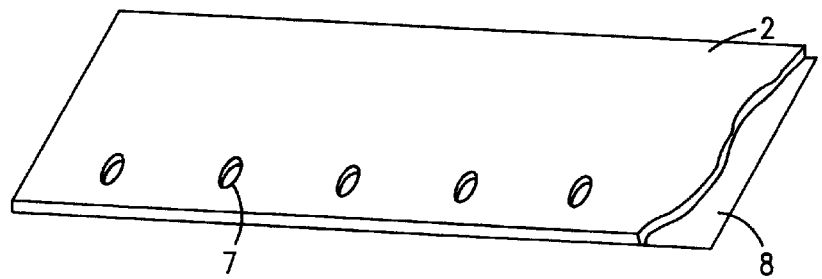
FIG. 5 is a perspective view of a band-shaped clad sheet for seal plates made by pressing together under pressure a cover plate used as the base material of the seal plates and a metal foil in accordance with the present invention.

First, exhaust holes 7 are punched at a fixed interval on an aluminum hoop 2 for cover plate having a predetermined width and thickness (for instance 0.6 mm). Next, on the surface of one side of the hoop for cover plate provided with exhaust holes 7, an aluminum foil having a predetermined thickness (for instance 0.03 mm) is laminated and cladded with the hoop into a single piece by passing them through a pair of rolls under pressure (ref. FIG. 5). During this cladding process, care has to be taken not to apply excessive pressure as slight elongation of the cover plate is caused by rolling.

Positioning is extremely important in performing processing at each process, in the process of incorporating various components, and in the final process of cutting into individual seal plates by punching and other means for use as an assembling component for each single cell. Pilot holes 18 for positioning during these processes are cut by punching at a fixed interval.

Next, after drawing the central portion of the seal plate by means of a press so that it is made downwardly concave, a hole for insertion of a rivet and a pouring hole 13 are punched.

A gasket 4 is molded by injection molding synthetic resin in the hole for insertion of a rivet and is integrally fixed with the seal plate. It is also possible to insert a gasket 4 previously prepared with a same synthetic resin into the hole for insertion of a rivet.

Figure 6:
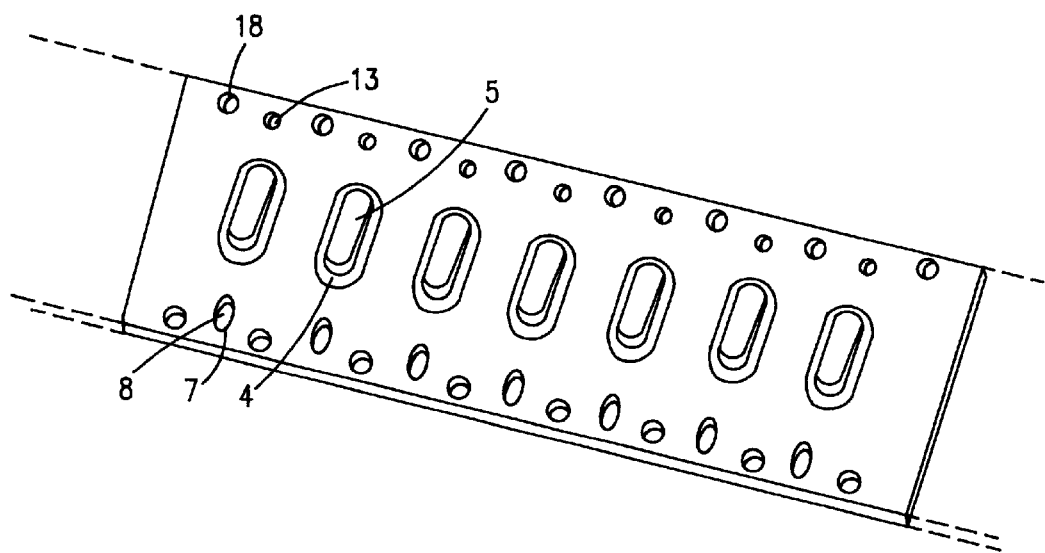
FIG. 6 is an external perspective view of a continuous band-shaped hoop for supplying seal plates in accordance with the present invention.

Subsequently, inspection of pinholes and lower limit of operating pressure of the explosion-proof safety vent is made on all samples, followed by coating, on the central portion of the gasket formed by molding through which a rivet is to be inserted, sealing paint prepared by dissolving blown asphalt and mineral oil in an organic solvent. After the solvent has evaporated, a rivet 5 made of nickel or nickel-plated steel is inserted in the central hole of the gasket 4, and the lower end of the rivet is crimped with a washer fitted in the lower portion of the rivet thereby configuring a terminal 5 in hermetically sealed condition (ref. FIG. 6). Each of the above described processes is progressed using the pilot hole 18 as the reference point.

As has been described, the seal plates continuously produced on a hoop are then transferred to subsequent process of battery assembling, and used after being punched one after another under the guidance of the pilot hole 18. Although the present invention has been described in detail taking a thin prismatic lithium-ion secondary battery as an example, it is not limited to this type of a battery system. The method of the present invention can be applied to non-aqueous electrolyte batteries in general in which the internal cell pressure abnormally rises due to external short-circuit, overcharge, or overdischarge that accompanies reverse charge such as in various types of lithium primary batteries employing organic electrolyte, lithium primary batteries employing thionyl chloride as the positive active material and in which solid electrolyte is formed on the surface of the negative electrode made of metallic lithium, and other lithium secondary batteries employing metallic lithium or lithium alloys as the negative electrode.

The construction of the present invention is also widely applicable not only to prismatic batteries but also to small-size batteries such as batteries having an oval cross section or cylindrical batteries having a small area of seal plate.

It is assumed that a PTC device be built in each cell or battery pack, or an overcharge and overdischarge protection circuit be provided in a battery pack comprising a plurality of cells.

It is also to be noted that though a description has been made of use of aluminum as an example for the bottomed cell container, cover plate, metal foil, rivet, washer, etc., the material is not limited to pure aluminum with the exception of the metal foil. For instance, use of aluminum alloys such as 3000 series Al—Mn system alloys, 4000 series Al—Si system alloys, 5000 series Al—Mg system alloys and the like which have a high mechanical strength and anti-corrosion property will not prohibit thinning of the cell container, cover plate and other housing material.

Industrial Applications

As has been described in the foregoing, the present invention provides a non-aqueous electrolyte battery in which a bottomed cell container made of metal and a seal plate made of the same metal as the cell container are laser welded and hermetically sealed with the latter fitted to the upper peripheral edge of an opening of the former, wherein a metal rivet which serves as a terminal is inserted via a gasket made of electrolyte-resistant and electrically insulating synthetic resin and fixed in a through hole provided in the central portion of the seal plate, at least one exhaust hole is provided between the terminal and the periphery of the seal plate, an explosion-proof safety vent in which the exhaust hole is closed by pressing a metal foil with pressure on the inner surface of a cover plate being the base material of the seal plate is provided, and the reliability of the vent action has been significantly improved and explosion accident of small-size batteries such as thin prismatic or with oval cross section can be completely prevented.

What is claimed:

1. A non-aqueous electrolyte battery, comprising:
   a positive electrode, a negative electrode, and a non-aqueous electrolyte situated in a container;
   a rivet coupled to one of said positive electrode and said negative electrode and serving as a terminal thereto;
   a gasket; and
   a seal plate closing an opening of said container, said seal plate coupled to another of said positive electrode and said negative electrode and serving as a further terminal thereto, said seal plate including (a) a through hole in which said rivet is inserted and fixed thereto via said gasket and (b) an exhaust opening spaced from said through hole and closed with metal foil.

2. The non-aqueous electrolyte battery as recited in claim 1, wherein the periphery of the through hole of the seal plate is concavely shaped toward the inside of the cell.

3. The non-aqueous electrolyte battery as recited in claim 1, wherein the gasket is made of polyphenylene sulfide resin.

4. The non-aqueous electrolyte battery as recited in claim 1, wherein the seal plate further includes at least one pouring hole which is sealed after pouring in said electrolyte.

5. The non-aqueous electrolyte battery as recited in claim 1, wherein the exhaust hole has an oval shape.

6. The non-aqueous electrolyte battery as recited in claim 1, further comprising a metal washer pressing against the gasket, said washer electrically connected between said rivet and said one of said positive electrode and said negative electrode.

7. The non-aqueous electrolyte battery as recited in claim 1, wherein the cell container and the seal plate include aluminum or aluminum alloy, the metal foil includes aluminum, and the rivet includes nickel or nickel-plated steel.

8. The non-aqueous electrolyte battery as recited in claim 1, wherein the cell container, the seal plate, and the metal foil include nickel, stainless steel or nickel-plated steel, and the rivet includes aluminum or aluminum alloy.

9. The non-aqueous electrolyte battery as recited in claim 1, wherein the metal foil closing the exhaust hole swells convexly outward of the cell.

10. The non-aqueous electrolyte battery as recited in claim 1, wherein a predetermined thin pattern is formed on the metal foil.

11. The non-aqueous electrolyte battery as recited in claim 1, wherein the outer surface of the metal foil closing the exhaust hole of the seal plate is coated with a film of non-moisture-absorbing, chemically stable, and plastic organic anti-corrosion agent.

12. The non-aqueous electrolyte battery as recited in claim 7, wherein the outer surface of the metal foil closing the exhaust hole of the seal plate is coated with a film of non-moisture-absorbing, chemically stable, and plastic organic anti-corrosion agent.

13. The non-aqueous electrolyte battery as recited in claim 8, wherein the outer surface of the metal foil closing the exhaust hole of the seal plate is coated with a film of non-moisture-absorbing, chemically stable, and plastic organic anti-corrosion agent.

14. The non-aqueous electrolyte battery as recited in claim 9, wherein the outer surface of the metal foil closing the exhaust hole of the seal plate is coated with a film of non-moisture-absorbing, chemically stable, and plastic organic anti-corrosion agent.

15. The non-aqueous electrolyte battery as recited in claim 10, wherein the outer surface of the metal foil closing the exhaust hole of the seal plate is coated with a film of non-moisture-absorbing, chemically stable, and plastic organic anti-corrosion agent.

16. The non-aqueous electrolyte battery as recited in claim 1, wherein said metal foil is shaped convexly as it extends outwardly from said exhaust opening.

17. A method of producing seal plates for non-aqueous electrolyte batteries, said method comprising the steps of:
    forming exhaust holes on a hoop of metal;
    closing said exhaust holes with a metal foil by pressing under pressure said metal foil to one of the surfaces of said hoop of metal thus producing a clad sheet;
    providing through holes on the clad sheet, said through holes spaced from said exhaust holes;
    forming gaskets having respective central holes in said through holes using electrolyte resistant and electrically insulating synthetic resin;
    inserting rivets serving as terminals in the respective central holes of said gaskets after coating the surface of said gaskets with a film of sealant and crimping said rivets; and
    cutting said hoop into individual seal plates for single cells.

18. The method of producing seal plate for non-aqueous electrolyte battery as recited in claim 17, wherein the step of forming a gasket in said through hole follows a step of concavely forming the periphery of the through hole.

19. The method of producing seal plate for non-aqueous electrolyte battery as recited in claim 17, wherein the gasket is made of polyphenylene sulfide.

20. The method of producing seal plate for non-aqueous electrolyte battery as recited in claim 17, wherein a pouring hole is formed on the clad sheet.

21. The method of producing seal plate for non-aqueous electrolyte battery as recited in claim 17, wherein the configuration of the exhaust hole is made oval.

22. The method of producing seal plate for non-aqueous electrolyte battery as recited in claim 17, wherein the terminal is hermetically fixed via the gasket by crimping the lower end of the rivet with a metal washer fitted beneath said rivet serving as the terminal.

23. The method of producing seal plate for non-aqueous electrolyte battery as recited in claim 17, wherein the hoop includes aluminum or aluminum alloy, the metal foil includes aluminum, and the rivet and the washer include nickel or nickel-plated steel.

24. The method of producing seal plate for non-aqueous electrolyte battery as recited in claim 17, wherein the cover plate material in the form of a hoop and the metal foil are made of nickel, stainless steel or nickel-plated steel, and the rivet and the washer are made of aluminum or aluminum alloy.

25. The method of producing seal plate for non-aqueous electrolyte battery as recited in claim 17, wherein the metal foil configuring the explosion-proof safety vent by closing the exhaust hole is convexly swelling upward.

26. The method of producing seal plate for non-aqueous electrolyte battery as recited in claim 17, wherein a predetermined thin pattern is formed in the proximity of the inner periphery of the exhaust hole on the metal foil configuring the explosion-proof safety vent by closing said exhaust hole.

27. The method of producing seal plate for non-aqueous electrolyte battery as recited in either of claim 17, wherein the outer surface of the metal foil configuring the explosion-proof safety vent by closing the exhaust hole is covered with a coated film of non-moisture-absorbing, chemically stable, and plastic organic anti-corrosion agent.

28. The method of producing seal plate for non-aqueous electrolyte battery as recited in either of claim 23, wherein the outer surface of the metal foil configuring the explosion-proof safety vent by closing the exhaust hole is covered with a coated film of non-moisture-absorbing, chemically stable, and plastic organic anti-corrosion agent.

29. The method of producing seal plate for non-aqueous electrolyte battery as recited in either of claim 24, wherein the outer surface of the metal foil configuring the explosion-proof safety vent by closing the exhaust hole is covered with a coated film of non-moisture-absorbing, chemically stable, and plastic organic anti-corrosion agent.

30. The method of producing seal plate for non-aqueous electrolyte battery as recited in either of claim 25, wherein the outer surface of the metal foil configuring the explosion-proof safety vent by closing the exhaust hole is covered with a coated film of non-moisture-absorbing, chemically stable, and plastic organic anti-corrosion agent.

31. The method of producing seal plate for non-aqueous electrolyte battery as recited in either of claim 26, wherein the outer surface of the metal foil configuring the explosion-proof safety vent by closing the exhaust hole is covered with a coated film of non-moisture-absorbing, chemically stable, and plastic organic anti-corrosion agent.

* * * * *